United States Patent [19]

Morlec et al.

[11] Patent Number: 5,458,675
[45] Date of Patent: Oct. 17, 1995

[54] PROCESS FOR THE TREATMENT OF VENTILATION AIR CONTAINING STYRENE

[75] Inventors: Jean Morlec, Saint Nazaire; Christine Travers, Rueil Malmaison; Claude Dezael, Maisons Laffitte, all of France

[73] Assignee: Institut Francais du Petrole, Rueil Malmaison, France

[21] Appl. No.: 209,498

[22] Filed: Mar. 4, 1994

[30] Foreign Application Priority Data

Mar. 5, 1993 [FR] France ............... 93 02670

[51] Int. Cl.⁶ .................................. B01D 53/04
[52] U.S. Cl. .................................. 95/143; 95/148
[58] Field of Search .............. 95/141, 143, 144, 95/148; 585/820, 826–829

[56] References Cited

U.S. PATENT DOCUMENTS

| | | | |
|---|---|---|---|
| 2,859,257 | 11/1958 | Hess et al. | 95/143 X |
| 3,392,508 | 7/1968 | Scholten et al. | 95/144 |
| 3,719,026 | 3/1973 | Sand | 95/143 X |
| 3,925,959 | 12/1975 | Dykes et al. | 53/28 |
| 4,234,549 | 11/1980 | Stanley et al. | 423/245 |
| 4,309,281 | 1/1982 | Dessau | 95/143 X |
| 4,469,936 | 11/1990 | Schweigert et al. | 55/179 |
| 4,725,417 | 2/1988 | Deschamps et al. | 423/244 |
| 4,781,903 | 11/1988 | Deschamps et al. | 423/244 |
| 4,784,672 | 11/1988 | Sircar | 95/143 X |
| 4,855,117 | 8/1989 | Deschamps et al. | 423/244 |
| 5,059,569 | 10/1991 | Deschamps et al. | 502/78 |
| 5,118,238 | 6/1992 | Wnuk et al. | 95/148 X |
| 5,312,477 | 5/1994 | Minor | 95/143 X |

FOREIGN PATENT DOCUMENTS

| | | |
|---|---|---|
| 2791 | 7/1979 | European Pat. Off. . |
| 3818 | 9/1979 | European Pat. Off. . |
| 325511 | 1/1989 | European Pat. Off. . |
| 0494550 | 7/1992 | European Pat. Off. . |
| 2687330 | 8/1993 | France . |
| 3338411 | 5/1985 | Germany ............. 95/143 |
| 91 10 837.3 | 2/1992 | Germany . |
| WO92/00793 | 7/1991 | WIPO . |

OTHER PUBLICATIONS

Abstract of FR 2,687,330; Derwent Publications.

*Primary Examiner*—Robert Spitzer
*Attorney, Agent, or Firm*—Millen, White, Zelano, & Branigan

[57] ABSTRACT

The invention concerns a process for the treatment of ventilation air containing malodorous gases, e.g., styrene, involving:

1. An adsorption step onto a hydrophobic zeolite containing, for example, platinum and/or palladium,
2. A combustion-desorption step wherein hot gases pass over the impregnated zeolite in order to desorb the gas, e.g., styrene and burn it on the zeolite, in which the zeolite is encased in small tetrahedral-shaped containers.

12 Claims, No Drawings

PROCESS FOR THE TREATMENT OF VENTILATION AIR CONTAINING STYRENE

SUMMARY OF THE INVENTION

The present invention concerns a process for the treatment of ventilation air containing malodorous gases, in particular styrene, improving on the subject matter of patent application No 92/01.907 of 18 Feb. 1992.

The aim of the process of the invention is to eliminate malodorous gases, in particular styrene which is unpleasant in the workplace and is responsible for atmospheric pollution. Heating costs can thus be minimised as a consequence, and NOx and COx pollution can also be reduced.

The process comprises the following successive steps:

1. An adsorption step: in this step, said gases are passed through a chamber containing at least one retention mass which is selective towards these gases and formed by at least one hydrophobic zeolite in order to adsorb the substance in said gas is adsorbed on said zeolite; in addition, the zeolite contains platinum and/or palladium or is mixed with a catalyst for initiating catalytic combustion: thus the combustion phase of step 2) is effected on the zeolite in the same chamber.

2. A combustion-desorption step: in this step, the hot gases are passed over said zeolite containing the adsorbed malodorous gases in order to desorb said substance and to burn it on the zeolite.

The invention is characterised in that the zeolite is enclosed by and divided between a plurality of individual containers which may optionally be connected to each other, each having a closed envelope which is permeable to gas and/or liquid and whose pores are sufficiently small to retain the granular solids it contains (ie, the zeolite). Each container comprises four substantially triangular faces substantially constituting a tetrahedron. Preferably, each container is connected to at least one adjacent container by one of its edges by a common connection, preferably by a common weld between two adjoining edges of said adjacent containers.

Each container is generally constructed from metallic sheet of any other equivalent material which can reduce pressure drops.

Since the surface-volume ratio of the containers is very high due to their tetrahedral shape, the properties of these containers are particularly well adapted to filling hollow columns with granular material such as a zeolite within the scope of the present invention.

It is well known to the skilled person that a particularly high surface-volume ratio will favour chemical reaction between the solid phase contained in the containers, whose outer envelope is porous, and the external liquid or gaseous phase.

It is further known that it is practically impossible to obtain completely close packing of regular tetrahedra in a column. However, one of the main advantages of using chains of tetrahedra is that packing can be effected in a known arrangement and distribution pattern. The pressure drop in the column can be limited to the maximum to result in a lower pressure drop than that obtained by loose packing of unconnected containers.

An arrangement which is particularly advantageous and simple to effect is to position the chains or strings of tetrahedra side by side, the chains or strings having a length equal to that of the column to be filled. This distribution results in columns with packing ratios of 0.30 to 0.90, preferably 0.55 to 0.90, ie, a void ratio of 0.70 to 0.10, preferably 0.45 to 0.10.

The permeable envelope used to make the container may be constructed from any solid material which will allow the passage of gas and/or liquids, but whose openings are sufficiently small to retain the particles of granular solid materials contained in the containers.

The material used to form the container envelopes may, for example, be a woven or nonwoven material.

The zeolite used is advantageously rendered hydrophobic by dealuminating a natural or synthetic zeolite, preferably a natural zeolite; any dealumination treatment known to the skilled person may be employed, for example direct acid treatment. This hydrophobic zeolite preferably has an atomic ratio of at least 25, and generally at least 30, for example between 30 and 40. It is normally selected from the group formed by mordenite and clinoptilolite.

The hot gases used in step 2) are introduced into the zeolite at a temperature generally between 200° C. and 350° C. They are usually inert combustion gases (for example a mixture of mainly carbon oxides, nitrogen oxides and water) from a boiler to which an increasing amount of oxygen is added. After a certain period of time, the hot gases may be constituted by hot air. Step 2) particularly allows regeneration of used and saturated zeolite.

The effluent from step 2) may optionally then undergo a final combustion step generally at a temperature greater than 800° C., for example in a boiler which may be that heating the gas used in combustion-desorption step 2).

The effluent from step 2) or from the final combustion step (if present in the inventive process) may advantageously undergo a step to eliminate sulphur oxides contained in said effluent. This step is of advantage when the malodorous and/or toxic gases for treatment contain sulphur compounds, for example mercaptans. This can usually reduce the sulphur oxide content to a value of less than 150 ppm. It can be effected using any sulphur oxide elimination method known to the skilled person, for example those described in our United States patents U.S. Pat. No. 4,725, 417, U.S. Pat. Nos. 4,781,903 and 4,855,117.

The effluent from step 2) or from the final combustion step (if present in the inventive process) may advantageously undergo a step to eliminate nitrogen oxides contained in said effluent. These nitrogen oxides generally come from the hot gases used during combustion-desorption step 2). This nitrogen oxide elimination step may be effected using any method known to the skilled person, for example by catalytic reduction selective for nitrogen oxides using ammonia. In particular, the method described in our European patent EP-A-O 325 511 may be used.

At least two zeolite masses may be alternately disposed in the malodorous and/or toxic gas circuit. Thus, when the first zeolite mass becomes saturated, the malodorous and/or toxic gas stream can be directed to the second zeolite mass: the first zeolite mass may then be regenerated without interruption to the treatment process.

The process may also be carried out at two geographically distinct locations: when the zeolite at a first location is saturated following adsorption step 1), it can be replaced at the same location by "new" zeolite and sent to a second location where combustion-desorption step 2) and the other optional steps described above can be carried out. Once regenerated, it can then if necessary be returned to the first location to replace the other zeolite which has become saturated. Thus the installations employed in the process of the invention do not necessarily have to be situated at the same geographical location.

We claim:

1. A process for treatment of ventilation air containing malodorous gases, said process comprising:

1) absorbing said gases, by passing through at least one chamber containing at least one retention mass which is selective to said gases, the retention mass being formed by at least one hydrophobic zeolite, said zeolite containing platinum and/or palladium or being mixed with a catalyst for initiating catalytic combustion, 2) subjecting the zeolite to combustion-desorption, wherein hot gases are passed over said zeolite in order to desorb and burn said gases on said zeolite, wherein said zeolite is enclosed in a plurality of individual containers which are connected to each other, each comprising a closed envelope which is permeable to gas and/or liquid and whose pores are sufficiently small to retain granular solids, each container comprising four substantially triangular faces substantially constituting a tetrahedron, each container further being connected to at least one adjacent container by one of its edges.

2. A process according to claim 1, wherein each container is connected to at least one adjacent container by one of its edges by a common weld between said edge and an adjacent edge of said adjacent container.

3. A process according to claim 1, wherein said container comprises a grating or lattice.

4. A process according to claim 3, wherein the grating or lattice is metallic.

5. A process according to claim 1, wherein said hydrophobic zeolite is prepared by dealumination of a natural or synthetic zeolite.

6. A process according to claim 5, wherein said hydrophobic zeolite is prepared by dealumination of a natural zeolite which is mordenite or clinoptilolite.

7. A process according to claim 1, wherein said hydrophobic zeolite has a Si/Al atomic ratio of at least 25.

8. A process according to claim 1 wherein, during combustion-desorption, the hot gases are introduced into said zeolite at a temperature of between 200° C. and 350° C.

9. A process according to claim 1, wherein the malodorous gas is styrene, and the retention mass is selective to styrene.

10. A process according to claim 1, wherein said container comprises a porous metal sheet.

11. A process according to claim 1, wherein said containers are present in chains or strings side-by-side in said chamber.

12. A process according to claim 11, wherein the chamber has a packing ratio of 0.45 to 0.10.

* * * * *